United States Patent
Liu et al.

(10) Patent No.: US 7,679,225 B2
(45) Date of Patent: Mar. 16, 2010

(54) VOICE COIL MOTORS AND PRE-COMPRESSION GENERATION DEVICES THEREOF

(75) Inventors: Chien-Sheng Liu, Tainan County (TW); Po-Heng Lin, Hualien County (TW); Yung-Hsing Wang, Taichung (TW); Shun-Sheng Ke, Kaohsiung (TW); Meng-Che Tsai, Kaohsiung (TW); Yu-Hsiu Chang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/966,877

(22) Filed: Dec. 28, 2007

(65) Prior Publication Data

US 2008/0284255 A1 Nov. 20, 2008

(30) Foreign Application Priority Data

May 15, 2007 (TW) .............................. 96117226 A

(51) Int. Cl.
*H02K 41/02* (2006.01)
(52) U.S. Cl. .................... 310/12.16; 310/12.01; 310/13
(58) Field of Classification Search ............. 310/12–15; 359/813, 814, 824
See application file for complete search history.

(56) References Cited

U.S. PATENT DOCUMENTS

| | | | |
|---|---|---|---|
| 4,678,951 A | | 7/1987 | Nikaido |
| 4,745,589 A | * | 5/1988 | Nomura .................... 369/44.16 |
| 5,220,461 A | | 6/1993 | Inoue et al. |
| 5,499,143 A | * | 3/1996 | Sakamoto et al. ........... 359/824 |
| 5,541,777 A | * | 7/1996 | Sakamoto et al. ........... 359/824 |
| 5,939,804 A | | 8/1999 | Nakao et al. |
| 6,608,541 B2 | | 8/2003 | Shiraki et al. |
| 6,856,469 B2 | | 2/2005 | Yoneyama et al. |
| 7,308,195 B2 | * | 12/2007 | Yumiki et al. ............... 396/75 |
| 7,391,579 B2 | * | 6/2008 | Ho et al. ..................... 359/696 |
| 2006/0214520 A1 | * | 9/2006 | Tseng ......................... 310/14 |
| 2007/0046109 A1 | * | 3/2007 | Ho et al. ..................... 310/12 |
| 2007/0097531 A1 | | 5/2007 | Kuo et al. |
| 2009/0140581 A1 | * | 6/2009 | Liu et al. ..................... 310/12 |

FOREIGN PATENT DOCUMENTS

| | | |
|---|---|---|
| JP | 01-196011 | 8/1989 |
| JP | 2003-207708 | 7/2003 |

(Continued)

*Primary Examiner*—Quyen Leung
*Assistant Examiner*—Leda Pham
(74) *Attorney, Agent, or Firm*—Quintero Law Office

(57) ABSTRACT

A voice coil motor. At least one guide bar is connected to a fixed base. A coil is connected to the fixed base. A support base is movably fit on the guide bar. An annular magnetic member is connected to the support base and surrounded by the coil. A magnetization direction of the annular magnetic member parallels a moving direction of the support base and annular magnetic member. The annular magnetic member includes a first magnetic pole and a second magnetic pole. The first magnetic pole is disposed in the coil and separated from the bottom thereof. The second magnetic pole is disposed outside the coil. The coil interacts with the annular magnetic member to generate a first force, driving the support base and annular magnetic member to move along the magnetization direction of the annular magnetic member.

22 Claims, 9 Drawing Sheets

FOREIGN PATENT DOCUMENTS

| | | |
|---|---|---|
| JP | 2005-128392 | 5/2005 |
| JP | 2005-128405 | 5/2005 |
| JP | 2005-141188 | 6/2005 |
| JP | 2005-250086 | 9/2005 |
| JP | 2006162876 | 6/2006 |
| JP | 2006-220776 | 8/2006 |
| TW | 176799 | 1/1992 |
| TW | 2005-25859 | 8/2005 |
| TW | I239432 B | 9/2005 |

* cited by examiner

VOICE COIL MOTORS AND PRE-COMPRESSION GENERATION DEVICES THEREOF

BACKGROUND OF THE INVENTION

1. Field of the Invention

The invention relates to voice coil motors, and more particularly to voice coil motors with reduced size and manufacturing costs and enhanced positioning precision.

2. Description of the Related Art

Cameras disposed in cellular phones have been developed to provide high definition quality and reduced power consumption, manufacturing costs, and size. As such, actuators disposed in the cameras, for moving lens modules thereof, are critical.

Automatic displacement driving devices applied in lens modules may employ drivers providing rotational power with a rotational axis thereof paralleling an optical axis of a lens module or drivers providing movement power with a moving direction thereof paralleling the optical axis of the lens module.

An example of a driver providing rotational power with a rotational axis thereof paralleling an optical axis of a lens module is a stepping motor. The driver requires additional transmission-conversion mechanisms to enable the lens module to move along an optical axis. When the lens module arrives at a final position, no electricity is required to maintain the lens module therein. However, the driver has many components. Thus, the structure of the driver is complicated, and the size thereof cannot be reduced.

An example of a driver providing movement power with a moving direction thereof paralleling an optical axis of a lens module is a voice coil motor, a piezoelectric actuator, or a liquid lens actuator. The driver directly adjusts the position of the lens module. Compared with the driver providing rotational power, this driver has fewer components and is small. Nevertheless, there is a need to further reduce the size and enhance precision of this driver.

Taiwan Patent Publication No. 200525859 discloses a voice coil motor with two opposite non-annular magnets and multiple yoke sets. The non-annular magnets and yoke sets form a movable magnetic assembly. Part of the magnetic lines output from the surface of the non-annular magnets and are transmitted to a magnetic-permeable shaft via the yoke sets, generating radial attraction (radial pre-compression force) between the movable magnetic assembly and the magnetic-permeable shaft. The radial attraction enables the movable magnetic assembly to slide with respect to the magnetic-permeable shaft in a smooth manner.

Referring to FIG. 1A and FIG. 1B, Japan Patent Publication No. 2005-128405 discloses a conventional lens driving device 1. An upper spring 9 and a lower spring 11 enable precise movement of a lens module 20 and reduce friction during movement thereof. The upper spring 9 and lower spring 11 may be regarded as extensions of the coil 15, serving as conductors at two ends thereof. Specifically, in the lens driving device 1, the upper spring 9 and lower spring 11 can provide axial pre-compression force to the lens module 20. Thus, the lens module 20 can be easily positioned in a specific position when the coil 15 is energized by application of a current. Nevertheless, as the lens driving device 1 must comprise a yoke 3 providing magnetic-permeable functions, the size and manufacturing costs thereof cannot be reduced.

Japan Patent Publication No. 2005-128392 and U.S. Pat. No. 6,856,469 disclose conventional lens driving devices providing axial pre-compression force with springs (resilient elements). The springs (resilient elements), however, are not easily manufactured and are easily deformed by external force, adversely affecting reduction of manufacturing costs of the lens driving devices. Additionally, comprising springs (resilient elements), the size of the lens driving devices cannot be reduced.

Japan Patent Publication No. 2003-207708, Japan Patent Publication No. 2006-220776, U.S. Pat. No. 4,678,951, U.S. Pat. No. 5,939,804, and U.S. Pat. No. 5,220,461 disclose voice coil motors with a magnetizing direction of a permanent magnet perpendicular to a moving direction thereof (namely, the permanent magnet is radially magnetized). To enhance utilization of magnetic flux from the permanent magnet, magnetic-permeable yokes are disposed on the radial lateral of the permanent magnet. However, reduction of the size of the voice coil motors is not easily achieved. Moreover, although the permanent magnet radially magnetized can be formed integrally, miniaturizing manufacture thereof is difficult. Several pieces are assembled to form the permanent magnet, thus increasing manufacturing costs of the voice coil motors.

Japan Patent Publication No. 1-196011, Taiwan Patent Publication No. 200525859, and Taiwan Patent No. 176799 disclose voice coil motors with a magnetizing direction of a permanent magnet parallel to a axially moving direction thereof. In Japan Patent Publication No. 1-196011, the permanent magnet is disposed on the radial single lateral of a lens module. As the permanent magnet does not overlap the lens module, the voice coil motor is not easily miniaturized. In Taiwan Patent Publication No. 200525859 and Taiwan Patent No. 176799, the voice coil motor comprises a plurality of permanent magnets. A coil is disposed between the permanent magnets and a magnetic-permeable yoke. Accordingly, assembly of the permanent magnets increases manufacturing costs and assembly tolerance, adversely affecting uniformity of the voice coil motor. Moreover, as the coil is disposed between the permanent magnets and the magnetic-permeable yoke, air gaps exist between the permanent magnets and the coil and between the magnetic-permeable yoke and the coil, respectively. Accordingly, miniaturization of the voice coil motor is not easily achieved due to the existence of the air gaps.

Japan Patent Publication No. 2005-250086 and Japan Patent Publication No. 2005-141188 disclose a voice coil motor with a coil disposed on a permanent magnet axially magnetized. The permanent magnet generates a closed route of magnetic lines. Although the magnetic lines from the permanent magnet vertically pass through the coil, the intensity of the magnetic lines passing through the coil is inversely proportional to the square of the distance between the coil and the permanent magnet. Namely, a magnetic force generated according to the Lorentz's law rapidly decreases by increase of the distance between the coil and the permanent magnet, regardless of the existence of a magnetic-permeable yoke. To solve the aforementioned problem, a current applied in the coil must be increased to raise the magnetic force generated according to the Lorentz's law. This operation, however, leads to increased power consumption and time for positioning control of the voice coil motor.

Hence, there is a need for voice coil motors with reduced size and manufacturing costs and enhanced positioning precision.

BRIEF SUMMARY OF THE INVENTION

A detailed description is given in the following embodiments with reference to the accompanying drawings.

An exemplary embodiment of the invention provides a voice coil motor comprising a fixed base, at least one guide bar, a coil, a support base, and an annular magnetic member. The guide bar is connected to the fixed base. The coil is connected to the fixed base. The support base is movably fit on the guide bar. The annular magnetic member is connected to the support base and surrounded by the coil. A magnetization direction of the annular magnetic member parallels a moving direction of the support base and the annular magnetic member. The annular magnetic member comprises a first magnetic pole and a second magnetic pole. The first magnetic pole is disposed in the coil and separated from the bottom of the coil. The second magnetic pole is disposed outside the coil. The coil interacts with the annular magnetic member to generate a first force, driving the support base and the annular magnetic member to move along the magnetization direction of the annular magnetic member.

The guide bar comprises magnetic-permeable material.

The annular magnetic member comprises a first central height plane perpendicular to the magnetization direction of the annular magnetic member. The guide bar comprises a second central height plane parallel to and separated from the first central height plane. The annular magnetic member and guide bar attract each other to generate a second force. The direction of the second force is opposite to that of the first force.

The voice coil motor further comprises a magnetic-permeable member connected to the fixed base.

The annular magnetic member comprises a first central height plane perpendicular to the magnetization direction of the annular magnetic member. The magnetic-permeable member comprises a third central height plane parallel to and separated from the first central height plane. The annular magnetic member and magnetic-permeable member attract each other to generate a third force. The direction of the third force is opposite to that of the first force.

The guide bar comprises non-magnetic-permeable material.

The guide bar is integrally formed with the fixed base by injection molding.

The voice coil motor further comprises a position sensor connected to the fixed base and opposing the annular magnetic member, detecting movement of the annular magnetic member.

The position sensor comprises a Hall sensor or a magnetic resistance sensing element.

The voice coil motor further comprises a position sensor and a positioning magnet. The positioning magnet is connected to the support base. The position sensor is connected to the fixed base and opposes the positioning magnet, detecting movement of the positioning magnet.

The voice coil motor further comprises a position sensor connected to the fixed base and opposing the support base, detecting movement of the support base.

The position sensor comprises a photo-interrupter comprising a light outputting portion and a light receiving portion. The support base comprises a reflective surface. The light outputting portion outputs light to the reflective surface, and the light receiving portion receives the light reflected by the reflective surface.

The position sensor comprises a photo-interrupter comprising a light outputting portion and a light receiving portion. The annular magnetic member comprises a reflective surface. The light outputting portion outputs light to the reflective surface, and the light receiving portion receives the light reflected by the reflective surface.

Another exemplary embodiment of the invention provides a pre-compression generation device comprising a magnetic member and a guide bar. A magnetization direction of the magnetic member is parallel to a moving direction thereof. The magnetic member comprises a first central height plane perpendicular to the magnetization direction thereof. The guide bar comprises magnetic-permeable material and a second central height plane parallel to and separated from the first central height plane. The magnetic member and guide bar attract each other to generate a pre-compression force.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

Figure 1A:
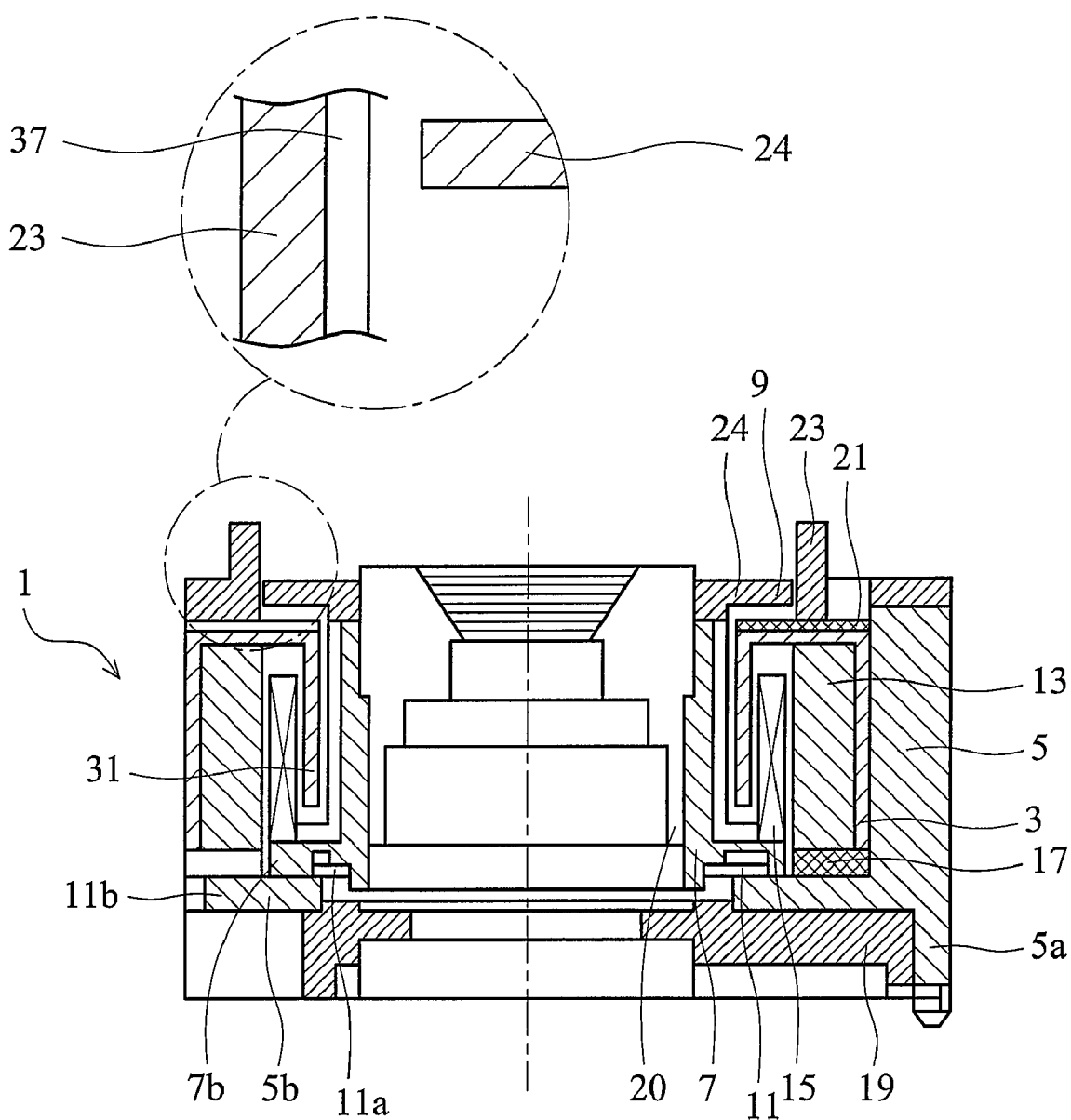
FIG. 1A is a schematic cross section of a conventional lens driving device.
Figure 1B:
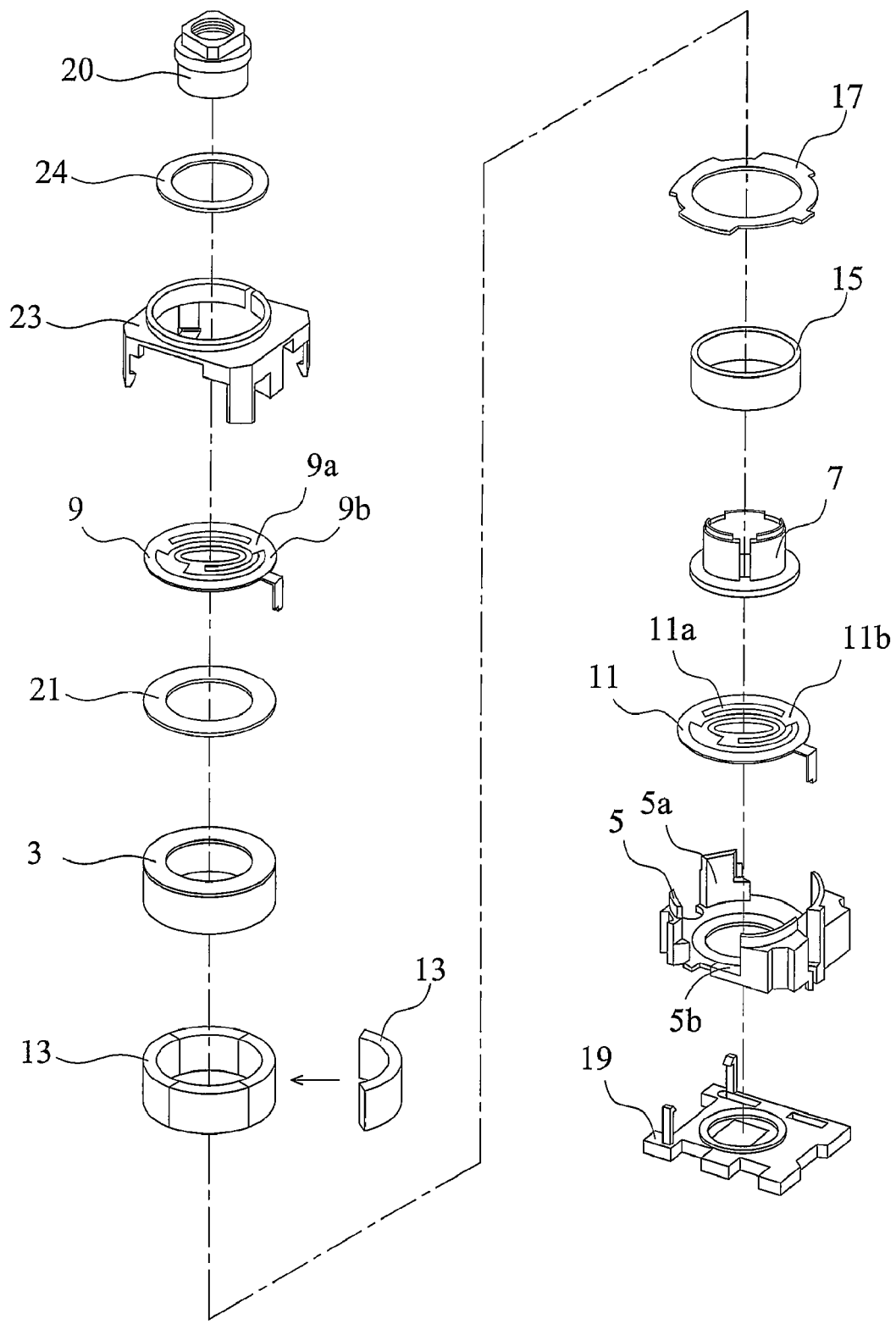
FIG. 1B is an exploded perspective view of the conventional lens driving device of FIG. 1A.
Figure 2A:
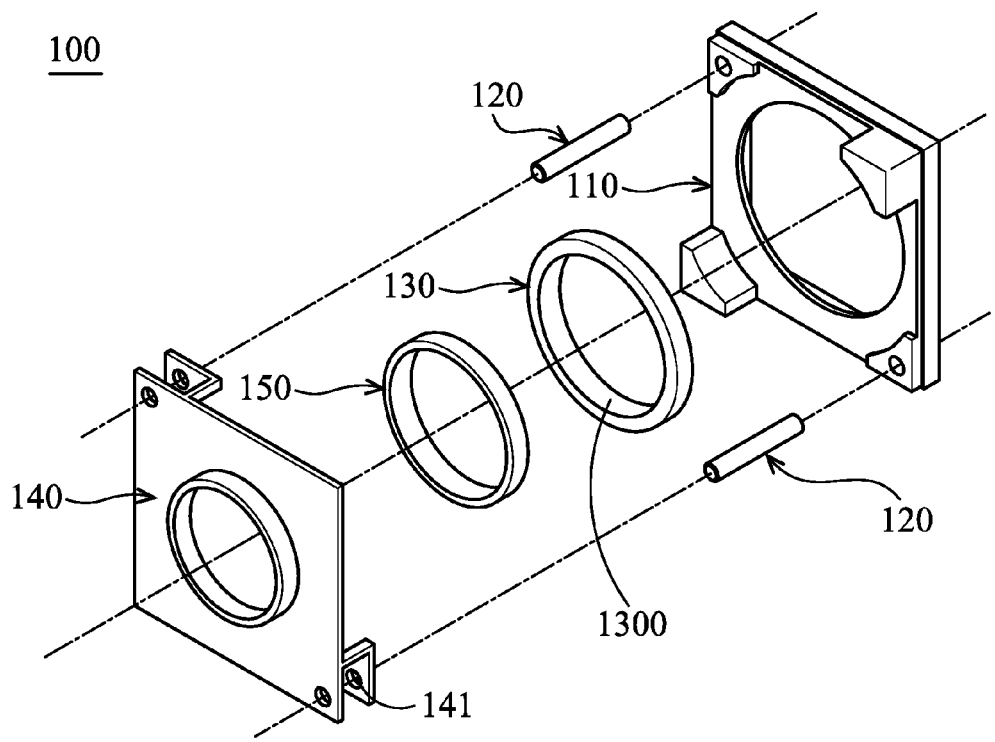
FIG. 2A is an exploded perspective view of a voice coil motor of a first embodiment of the invention.
Figure 2B:
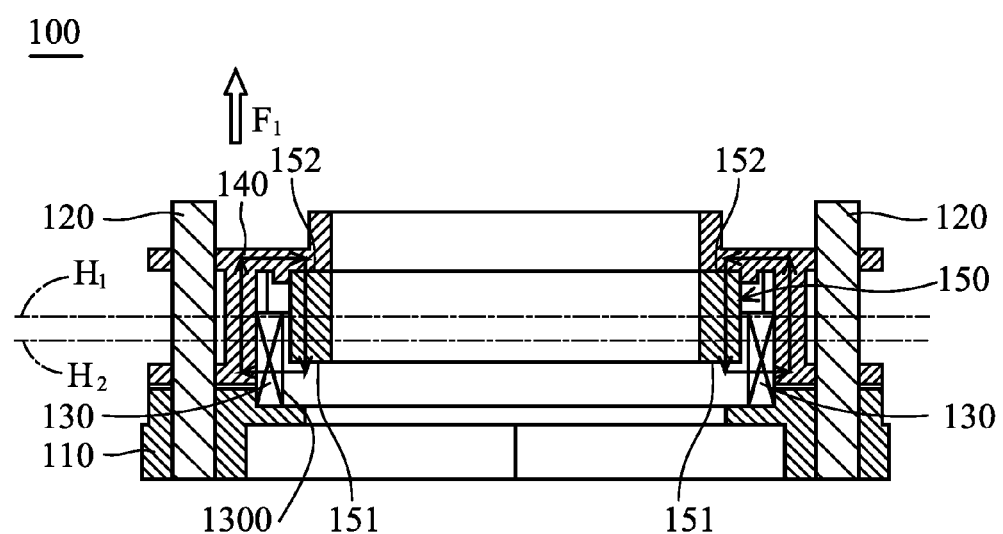
FIG. 2B is a schematic cross section of the voice coil motor of the first embodiment of the invention.

Referring to FIG. 2A and FIG. 2B, a voice coil motor 100 drives a lens module of a camera to perform zoom movement and comprises a fixed base 110, two opposite guide bars 120, a coil 130 having a bottom 1300, a support base 140, and an annular magnetic member 150 formed into a single ring niece. The fixed base 110, the guide bars 120, and the coil 130 may be regarded as fixed members of the voice coil motor 100, while the support base 140 and the annular magnetic member 150 may be regarded as movable members thereof.

The guide bars 120 are connected to the fixed base 110. Here, the guide bars 120 comprise magnetic-permeable material (or one of the guide bars 120 comprises magnetic-permeable material). Specifically, the guide bars 120 comprise a second central height plane $H_2$, as shown in FIG. 2B.

The coil 130 is connected to the fixed base 110.

The support base 140 is movably fit on the guide bars 120 to be moved along an axially moving direction with respect to the guide bars 120. As shown in FIG. 2A, the support base 140 comprises a plurality of through holes 141 in which the guide bars 120 are fit. Namely, the support base 140 is fit on the guide bars 120 via the through holes 141 to be moved along the axially moving direction with respect to the guide bars 120. Moreover, the support base 140 can support a lens module (not shown). P As shown in FIG. 2B, the annular magnetic member 150 is connected to the support base 140 and surrounded by the coil 130. Specifically, a magnetization direction of the annular magnetic member 150 parallels the axially moving direction of the support base 140 and the annular magnetic member 150. Namely, the annular magnetic member 150 is not radially magnetized, but axially magnetized. Moreover, the annular magnetic member 150 comprises a first magnetic pole 151, a second magnetic pole 152, and a first central height plane $H_1$. The first magnetic pole (such as N pole) 151 is disposed in the coil 130 and separated from the bottom 1300 of the coil 130. The second magnetic pole (such as S pole) 152 is disposed outside the coil 130. Namely, the second magnetic pole 152 is above the coil 130. The first central height plane $H_1$ is perpendicular to the magnetization direction of the annular magnetic member 150. The second central height plane $H_2$ of the guide bars 120 is parallel to and separated from the first central height plane $H_1$ of the annular magnetic member 150. In this embodiment, the annular magnetic member 150 may be a permanent magnet.

Accordingly, the annular magnetic member 150 provides closed magnetic lines vertically passing through the coil 130. When being energized by application of a current, the coil 130 interacts with the magnetic lines provided by the annular magnetic member 150 to generate a first force $F_1$ according to the Lorentz's law. The first force $F_1$ drives the support base 140 and the annular magnetic member 150 to move along the magnetization direction of the annular magnetic member 150. Here, the magnitude of the first force $F_1$ is directly related to turns of winding/current intensity/size of the coil 130, magnetization intensity/size of the annular magnetic member 150, distance by which the first magnetic pole 151 is separated from the bottom 1300 of the coil 130, and dimension of an air gap between the annular magnetic member 150 and the coil 130. For example, when the sizes of the coil 130 and the annular magnetic member 150 are fixed and the coil 130 is energized by application of a current with specific intensity, different distances by which the first magnetic pole 151 is separated from the bottom 1300 of the coil 130 lead to different-magnitude first forces $F_1$. Based upon experimental results, when the distance by which the first magnetic pole 151 is separated from the bottom 1300 of the coil 130 is within a certain range, the magnitude of the first force $F_1$ generated according to the Lorentz's law is maximum and uniform. Precise positioning can thus be performed using the first force $F_1$.

Figure 3:
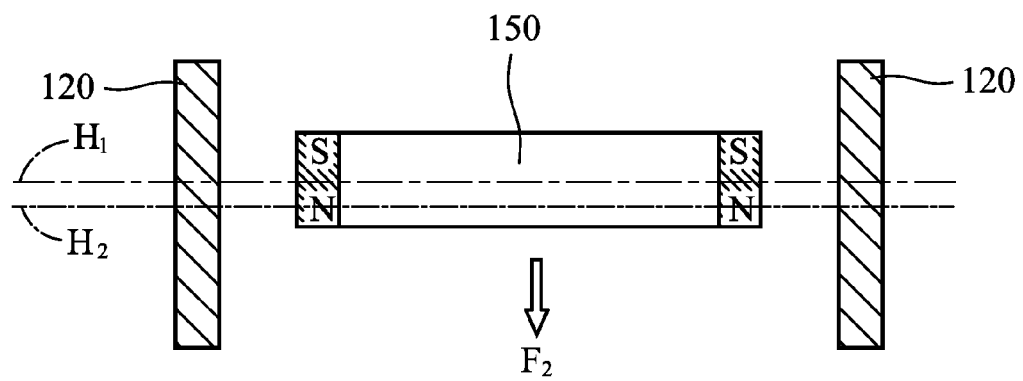
FIG. 3 is a schematic partial view of FIG. 2B.

In another aspect, the annular magnetic member 150 and the guide bars 120 constitute a pre-compression generation device. Specifically, as shown in FIG. 3, as the guide bars 120 comprise magnetic-permeable material (or one of the guide bars 120 comprises magnetic-permeable material) and the second central height plane $H_2$ is parallel to and separated from the first central height plane $H_1$, the annular magnetic member 150 and the guide bars 120 attract each other to generate a second force $F_2$ (i.e. an axial pre-compression force parallel to the magnetization direction of the annular magnetic member 150). Moreover, the annular magnetic member 150 may be replaced by a non-annular magnetic member, such as a disc permanent magnet. Specifically, the direction of the second force $F_2$ is opposite to that of the first force $F_1$. When the annular magnetic member 150 moves along the magnetization direction thereof to enlarge the distance between the first central height plane $H_1$ and the second central height plane $H_2$, the magnitude of the second force (axial pre-compression force) $F_2$ increases. Here, the second force (axial pre-compression force) $F_2$ can restore the voice coil motor 100 to an original position. Namely, the second force (axial pre-compression force) $F_2$ can balance the first force $F_1$ generated according to the Lorentz's law, enabling the support base 140 and the annular magnetic member 150 to be positioned in a specific position. Additionally, being magnetic-permeable, the guide bars 120 can serve as magnetic-permeable yokes, thereby increasing the magnitude of the first force $F_1$ generated between the coil 130 and the annular magnetic member 150 according to the Lorentz's law.

Figure 4:
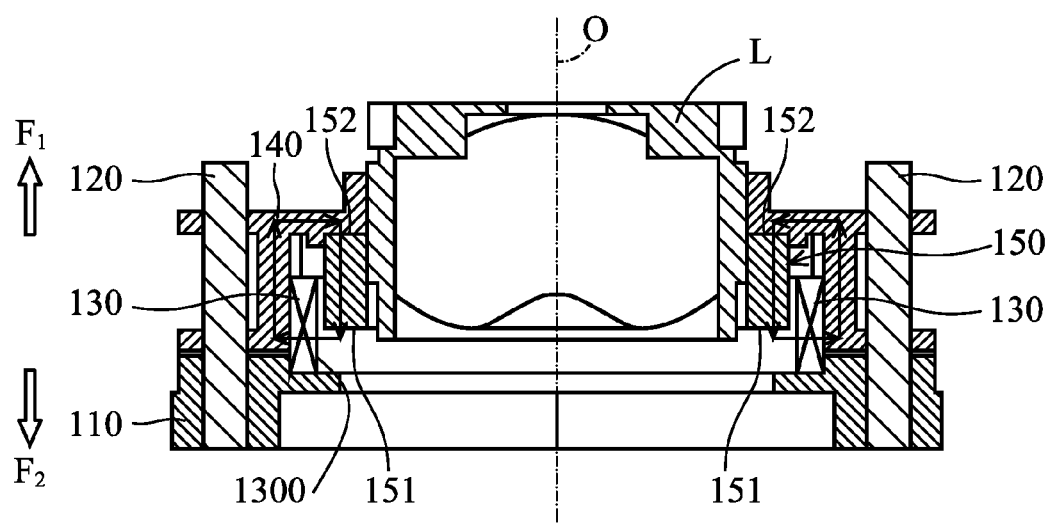
FIG. 4 is a schematic cross section of a lens module and the voice coil motor of the first embodiment of the invention.

When the voice coil motor 100 is employed to drive a lens module L of a camera to perform zoom movement, the construction is shown in FIG. 4. The lens module L is supported by the support base 140 and provided with an optical axis O. The magnetization direction of the annular magnetic member 150 parallels the optical axis O. The closed magnetic lines provided by the annular magnetic member 150 vertically pass through the coil 130 energized by application of a current. At this point, the first force $F_1$ generated according to the Lorentz's law and parallel to the optical axis O drives the lens module L, the support base 140, and the annular magnetic member 150 to move along the optical axis O or magnetization direction of the annular magnetic member 150. At the same time, the annular magnetic member 150 and the guide bars 120 attract each other to generate the second force (axial pre-compression force) $F_2$ parallel to the optical axis O and opposite to the first force $F_1$. Accordingly, the first force $F_1$ balances the second force (axial pre-compression force) $F_2$ to position the lens module L. Zoom or focus operation of the lens module L is thus performed. Moreover, when the application of the current in the coil 130 terminates, the first force $F_1$ vanishes. The lens module L, the support base 140, and the annular magnetic member 150 return to their original positions by the second force (axial pre-compression force) $F_2$.

Additionally, the annular magnetic member 150 is not limited to circular construction. Namely, to enhance a magnetic force generated between the annular magnetic member 150 and the coil 130, the annular magnetic member 150 may have non-circular construction to increase an area at which the annular magnetic member 150 interacts with the coil 130.

Second Embodiment

Elements corresponding to those in the first embodiment share the same reference numerals.

Figure 5:
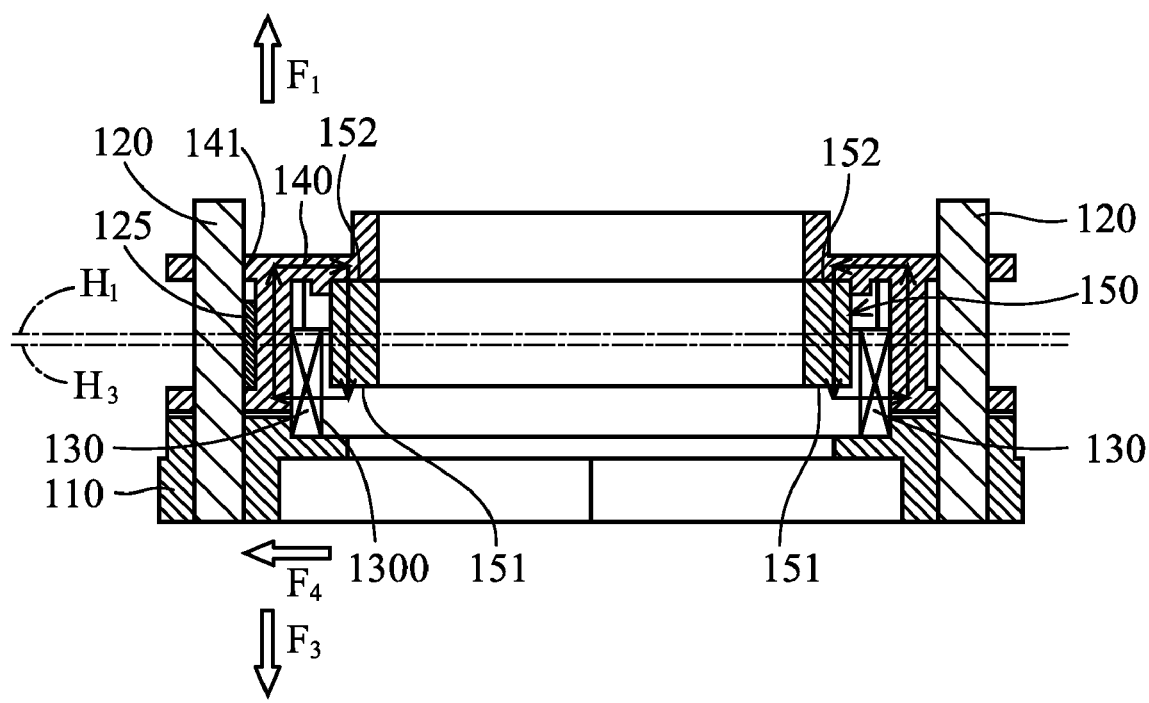
FIG. 5 is a schematic cross section of a voice coil motor of a second embodiment of the invention.

Referring to FIG. 5, a voice coil motor 200 drives a lens module of a camera to perform zoom movement and comprises a fixed base 110, two opposite guide bars 120, a magnetic-permeable member 125, a coil 130, a support base 140, and an annular magnetic member 150. The fixed base 110, the guide bars 120, the magnetic-permeable member 125, and the coil 130 may be regarded as fixed members of the voice coil motor 200, while the support base 140 and the annular magnetic member 150 may be regarded as movable members thereof.

In this embodiment, generation of the first force $F_1$ according to the Lorentz's law is the same as that of the first embodiment, and explanation thereof is omitted. The guide bars 120 comprise non-magnetic-permeable material and may be integrally formed with the fixed base 110 by injection molding. The magnetic-permeable member 125 comprises a third central height plane $H_3$. In another aspect, the annular magnetic member 150 and magnetic-permeable member 125 constitute a pre-compression generation device. Specifically, as the magnetic-permeable member 125 comprises magnetic-permeable material and the third central height plane $H_3$ is parallel to and separated from the first central height plane $H_1$, the annular magnetic member 150 and magnetic-permeable member 125 attract each other to generate a third force $F_3$ (i.e. an axial pre-compression force parallel to the magnetization direction of the annular magnetic member 150). Moreover, the direction of the third force $F_3$ is opposite to that of the first force $F_1$. When the annular magnetic member 150 moves along the magnetization direction thereof to enlarge the distance between the first central height plane $H_1$ and the third central height plane $H_3$, the magnitude of the third force $F_3$ increases. Here, the third force $F_3$ can restore the voice coil motor 200 to an original position. Namely, the third force $F_3$ is so called axial pre-compression force. It can balance the first force $F_1$ generated according to the Lorentz's law, enabling the support base 140 and annular magnetic member 150 to be positioned in a specific position.

Structure, disposition, and function of other elements in this embodiment are the same as those in the first embodiment, and explanation thereof is omitted for simplicity.

Additionally, a radial attraction force $F_4$ is generated between the magnetic-permeable member 125 and the annular magnetic member 150. When the movable members move on the guide bars 120 by the through holes 141 of the support base 140, the through holes 141 abut the guide bars 120 in the existence of the radial attraction force $F_4$, enabling the support base 140 to move smoothly, and further reducing oscillation of the support base 140 during movement thereof.

Third Embodiment

Elements corresponding to those in the first embodiment share the same reference numerals.

Figure 6A:
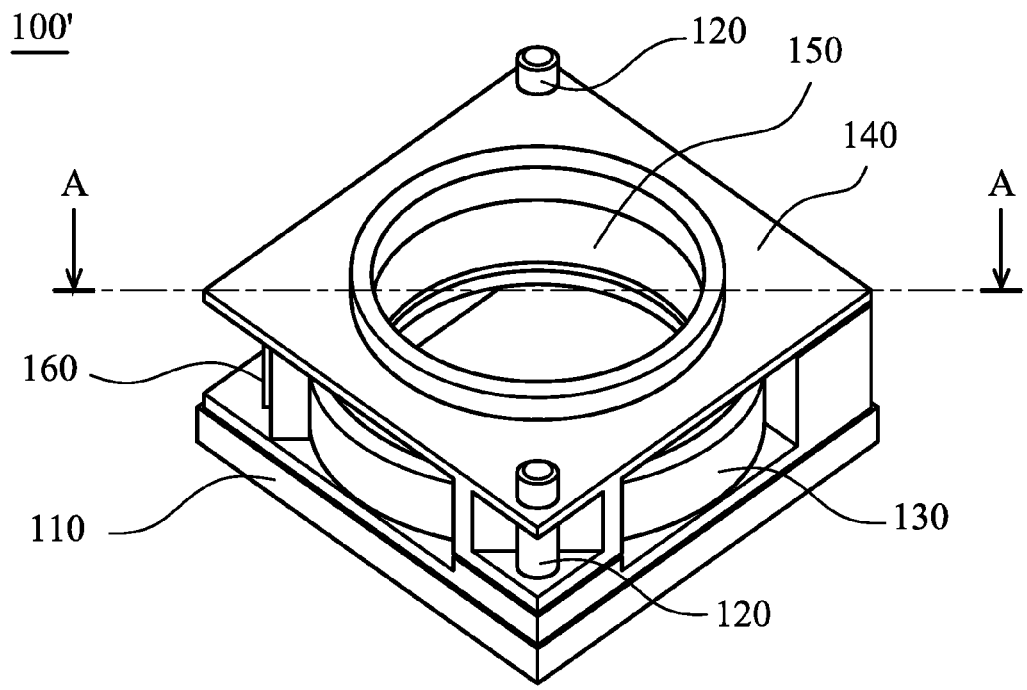
FIG. 6A is a schematic perspective view of a voice coil motor of a third embodiment of the invention.
Figure 6B:
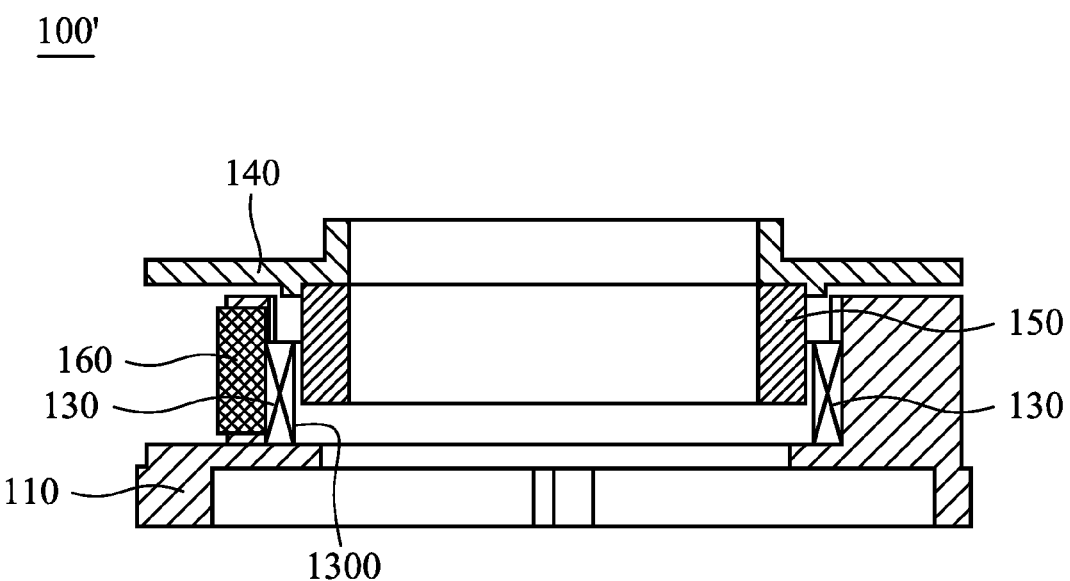
FIG. 6B is a schematic cross section taken along line A-A of FIG. 6A.

Referring to FIG. 6A and FIG. 6B, a voice coil motor 100' drives a lens module of a camera to perform zoom movement. Specifically, the voice coil motor 100' comprises a position sensor 160 connected to the fixed base 110 and opposing the annular magnetic member 150. In this embodiment, the position sensor 160 may be a Hall sensor or a magnetic resistance sensing element.

Structure, disposition, and function of other elements in this embodiment are the same as those in the first embodiment, and explanation thereof is omitted for simplicity.

When the support base 140 and the annular magnetic member 150 move along the magnetization direction of the annular magnetic member 150, the position sensor 160 detects the intensity of a magnetic field, in a fixed position in the voice coil motor 100', provided by the annular magnetic member 150. Here, the intensity of the magnetic field in the fixed position is related to displacement of the annular magnetic member 150. By combining the position sensor 160 with a positioning controller (not shown), closed-loop positioning control can be obtained. The moving position of the support base 140 and the annular magnetic member 150 is thus controlled.

Moreover, the guide bars 120 may selectively comprise non-magnetic-permeable material. Similarly, the guide bars 120 may be integrally formed with the fixed base 110 by injection molding.

Fourth Embodiment

Elements corresponding to those in the first embodiment share the same reference numerals.

Figure 7A:
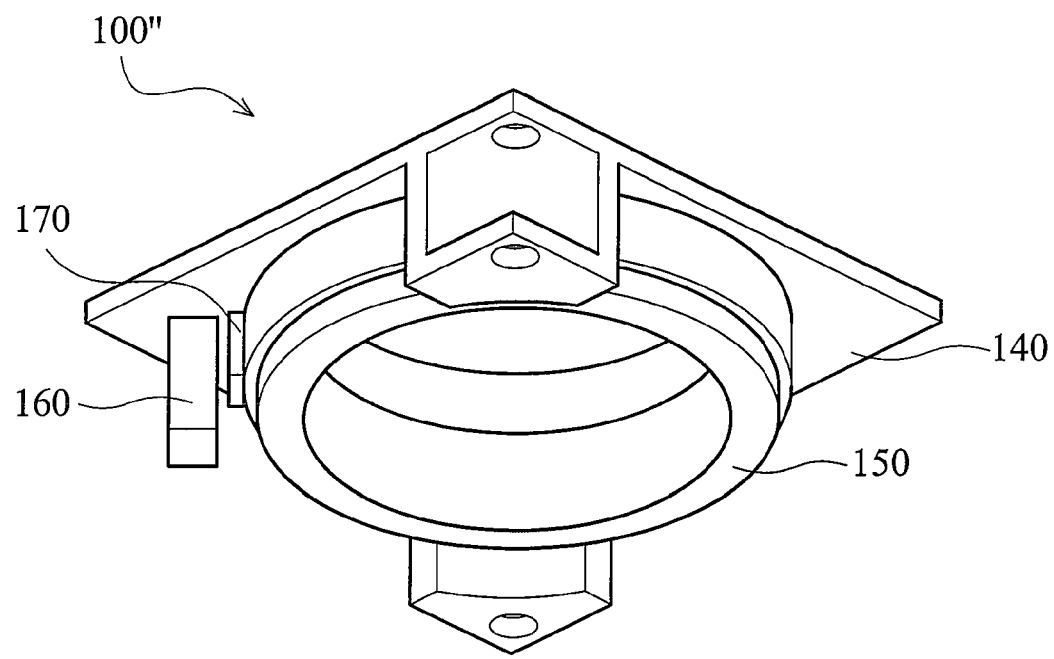
FIG. 7A is a partial perspective view of a voice coil motor of a fourth embodiment of the invention.
Figure 7B:
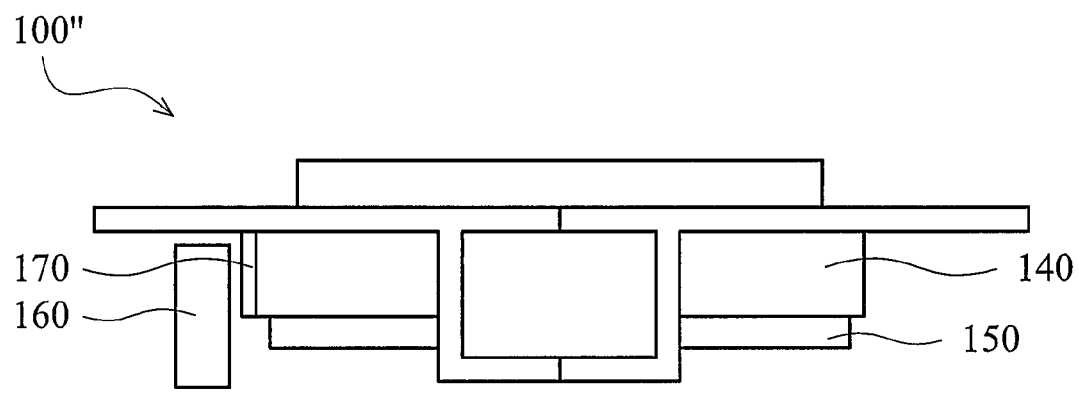
FIG. 7B is a schematic front view of FIG. 7A.

Referring to FIG. 7A and FIG. 7B, a voice coil motor 100" drives a lens module of a camera to perform zoom movement. Specifically, the voice coil motor 100" comprises a position sensor 160 and a positioning magnet 170. The positioning magnet 170 is connected to the support base 140. The position sensor 160 is connected to the fixed base 110 and opposes the positioning magnet 170. In this embodiment, the position sensor 160 may be a Hall sensor or a magnetic resistance sensing element.

Structure, disposition, and function of other elements in this embodiment are the same as those in the first embodiment, and explanation thereof is omitted for simplicity.

When the support base 140 and the annular magnetic member 150 move along the magnetization direction of the annular magnetic member 150, the position sensor 160 detects the intensity of a magnetic field, in a fixed position in the voice coil motor 100", provided by the positioning magnet 170. Here, the intensity of the magnetic field in the fixed position is related to displacement of the positioning magnet 170. By combining the position sensor 160 with a positioning controller (not shown), closed-loop positioning control can be obtained. The moving position of the support base 140 and the annular magnetic member 150 is thus controlled.

Fifth Embodiment

Elements corresponding to those in the first embodiment share the same reference numerals.

Figure 8A:
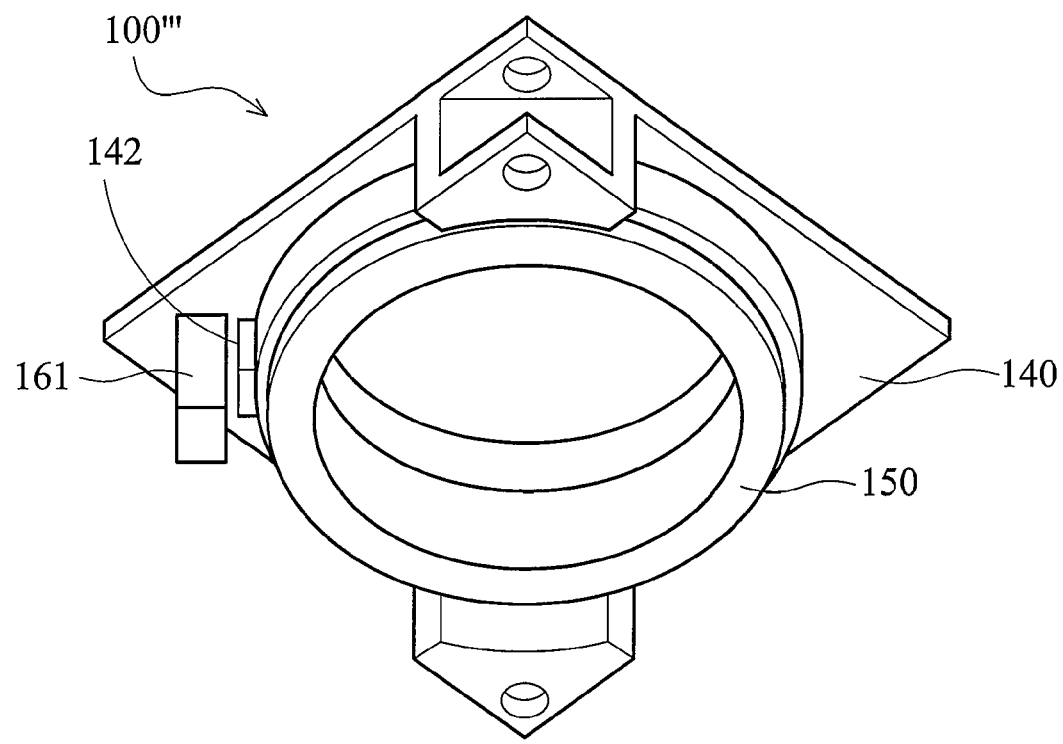
FIG. 8A is a partial perspective view of a voice coil motor of a fifth embodiment of the invention.
Figure 8B:
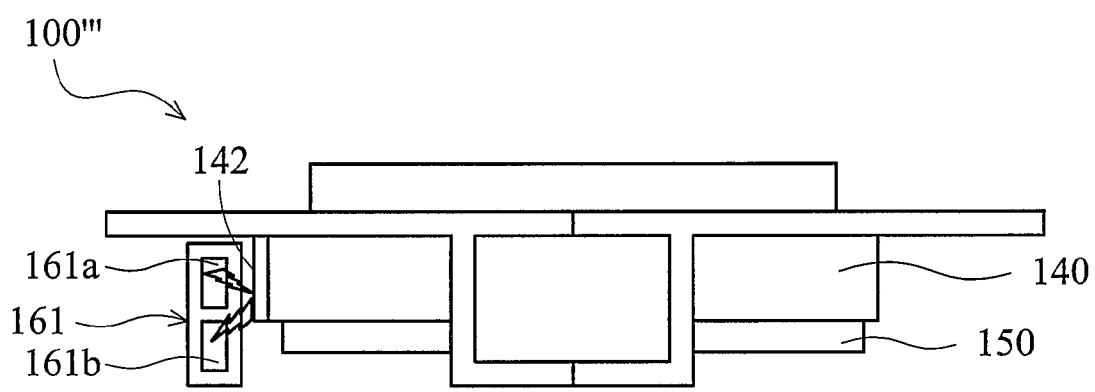
FIG. 8B is a schematic front view of FIG. 8A.

Referring to FIG. 8A and FIG. 8B, a voice coil motor 100''' drives a lens module of a camera to perform zoom movement. Specifically, the voice coil motor 100''' comprises a position sensor 161 connected to the fixed base 110 and opposing the support base 140. In this embodiment, the position sensor 161 may be a photo-interrupter comprising a light outputting portion 161a and a light receiving portion 161b. The support base 140 comprises a reflective surface 142.

Structure, disposition, and function of other elements in this embodiment are the same as those in the first embodiment, and explanation thereof is omitted for simplicity.

The light outputting portion 161a of the position sensor 161 outputs light to the reflective surface 142 of the support base 140. The light receiving portion 161b of the position sensor 161 receives the light reflected by the reflective surface 142.

When the support base 140 and the annular magnetic member 150 move along the magnetization direction of the annular magnetic member 150, the amount of the reflected light received by the light receiving portion 161b of the position sensor 161 is related to displacement of the support base 140. By combining the position sensor 161 with a positioning controller (not shown), closed-loop positioning control can be obtained. The moving position of the support base 140 and the annular magnetic member 150 is thus controlled.

Sixth Embodiment

Elements corresponding to those in the first embodiment share the same reference numerals.

Figure 9:
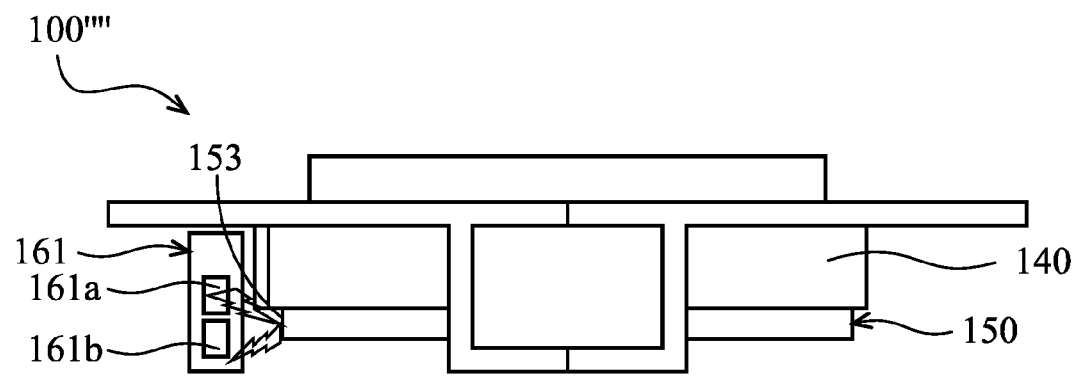
FIG. 9 is a partial front view of a voice coil motor of a sixth embodiment of the invention.

Referring to FIG. 9, a voice coil motor 100'''' drives a lens module of a camera to perform zoom movement. Specifically, the voice coil motor 100'''' comprises a position sensor 161 connected to the fixed base 110 and opposing the annular magnetic member 150. In this embodiment, the position sensor 161 may be a photo-interrupter comprising a light outputting portion 161a and a light receiving portion 161b. The annular magnetic member 150 comprises a reflective surface 153.

Structure, disposition, and function of other elements in this embodiment are the same as those in the first embodiment, and explanation thereof is omitted for simplicity.

The light outputting portion 161a of the position sensor 161 outputs light to the reflective surface 153 of the annular magnetic member 150. The light receiving portion 161b of the position sensor 161 receives the light reflected by the reflective surface 153.

When the support base 140 and the annular magnetic member 150 move along the magnetization direction of the annular magnetic member 150, the amount of the reflected light received by the light receiving portion 161b of the position sensor 161 is related to displacement of the annular magnetic member 150. Similarly, by combining the position sensor 161 with a positioning controller (not shown), closed-loop positioning control can be obtained. The moving position of the support base 140 and the annular magnetic member 150 is thus controlled.

Seventh Embodiment

Figure 10:
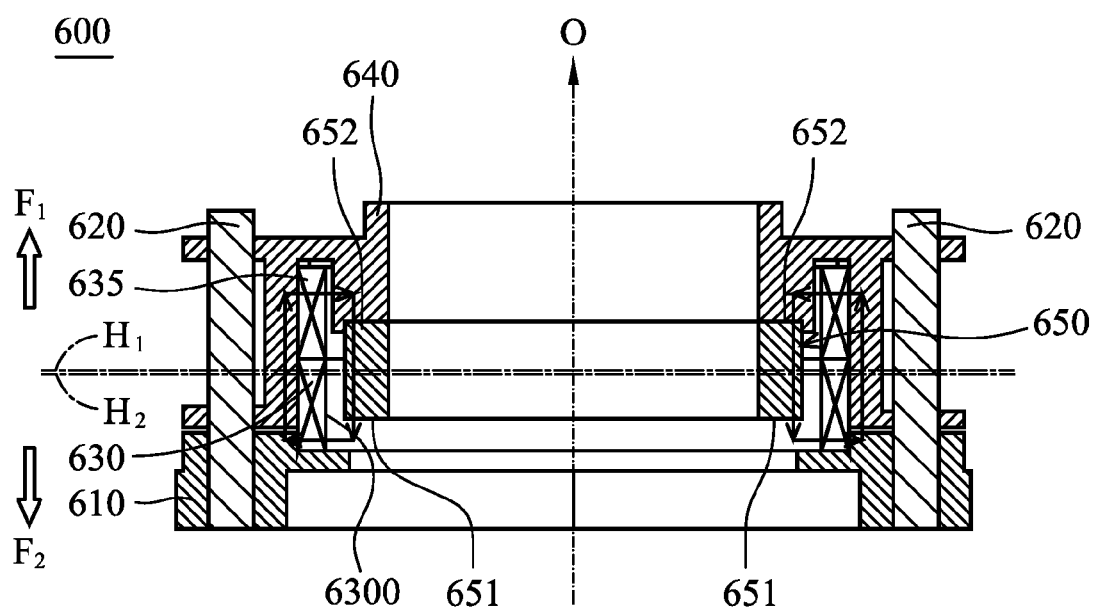
FIG. 10 is a schematic cross section of a voice coil motor of a seventh embodiment of the invention.

Referring to FIG. 10, a voice coil motor 600 drives a lens module of a camera to perform zoom movement and comprises a fixed base 610, two opposite guide bars 620, a first coil 630, a second coil 635, a support base 640, and an annular magnetic member 650. The fixed base 610, the guide bars 620, the first coil 630, and the second coil 635 may be regarded as fixed members of the voice coil motor 600, while the support base 640 and the annular magnetic member 650 may be regarded as movable members thereof.

The guide bars 620 are connected to the fixed base 610. Here, the guide bars 620 comprise magnetic-permeable material (or one of the guide bars 620 comprises magnetic-permeable material). Specifically, the guide bars 620 comprise a same second central height plane $H_2$.

The first coil 630 is connected to the fixed base 610.

The second coil 635 is connected to and disposed on the fixed coil 630. Specifically, a central axis of the first coil 630 aligns that of the second coil 635. Moreover, the size of the first coil 630 is the same as that of the second coil 635.

The support base 640 is movably fit on the guide bars 620, supporting a lens module (not shown).

The annular magnetic member 650 is connected to the support base 640 and surrounded by the first coil 630 and the second coil 635. Specifically, a magnetization direction of the annular magnetic member 650 parallels the axially moving direction of the support base 640 and the annular magnetic member 650. Namely, the annular magnetic member 650 is not radially magnetized, but axially magnetized. Moreover, the annular magnetic member 650 comprises a first magnetic pole 651, a second magnetic pole 652, and a first central height plane $H_1$. The first magnetic pole (such as N pole) 651 is disposed in the first coil 630 and separated from the bottom 6300 of the first coil 630. The second magnetic pole (such as S pole) 652 is disposed in the second coil 635. The first central height plane $H_1$ is perpendicular to the magnetization direction of the annular magnetic member 650. The second central height plane $H_2$ of the guide bars 620 is parallel to and separated from the first central height plane $H_1$ of the annular magnetic member 650. In this embodiment, the annular magnetic member 650 may be a permanent magnet.

As shown in FIG. 10, the annular magnetic member 650 provides closed magnetic lines vertically passing through the first coil 630 and second coil 635. When being energized by application of opposite currents, the first coil 630 and the second coil 635 respectively interact with the magnetic lines provided by the annular magnetic member 650 to generate a resultant first force $F_1$ according to the Lorentz's law. The first force $F_1$ drives the support base 640 and the annular magnetic member 650 to move along the magnetization direction of the annular magnetic member 650. Accordingly, as the magnetic lines or flux provided by the annular magnetic member 650 can be completely utilized by the first coil 630 and second coil 635, the first force $F_1$ is significantly increased.

Similarly, the annular magnetic member 650 and the guide bars 620 constitute a pre-compression generation device. Specifically, as the guide bars 620 comprise magnetic-permeable material (or one of the guide bars 620 comprises magnetic-permeable material) and the second central height plane $H_2$ is parallel to and separated from the first central height plane $H_1$, the annular magnetic member 650 and the guide bars 620 attract each other to generate a second force $F_2$ (i.e. an axial pre-compression force parallel to the magnetization direction of the annular magnetic member 650). Specifically, the direction of the second force $F_2$ is opposite to that of the first force $F_1$. When the annular magnetic member 650 moves along the magnetization direction thereof to enlarge the distance between the first central height plane $H_1$ and the second central height plane $H_2$, the magnitude of the second force (axial pre-compression force) $F_2$ increases. Here, the second force (axial pre-compression force) $F_2$ can restore the voice coil motor 600 to an original position. Namely, the second force (axial pre-compression force) $F_2$ can balance the first force $F_1$ generated according to the Lorentz's law, enabling the support base 640 and the annular magnetic member 650 to be positioned in a specific position. Additionally, being magnetic-permeable, the guide bars 620 can serve as magnetic-permeable yokes, thereby increasing the magnitude of the resultant first force $F_1$ generated between the first coil 630, the second coil 635, and the annular magnetic member 650 according to the Lorentz's law.

Moreover, when the application of the currents in the first coil 630 and the second coil 635 terminates, the first force $F_1$ vanishes. The support base 640 and the annular magnetic member 650 return to their original positions by the second force (axial pre-compression force) $F_2$.

Similarly, the annular magnetic member 650 is not limited to circular construction. Namely, to enhance a magnetic force generated between the annular magnetic member 650, the first coil 630, and the second coil 635, the annular magnetic member 650 may have non-circular construction to increase an area at which the annular magnetic member 650 interacts with the first coil 630 and the second coil 635.

As described in the third embodiment, by combining a position sensor (not shown) with a positioning controller (not shown), closed-loop positioning control can be obtained. The moving position of the support base 640 and the annular magnetic member 650 is thus controlled.

Additionally, the guide bars 620 may selectively comprise non-magnetic-permeable material. Similarly, the guide bars 620 may be integrally formed with the fixed base 610 by injection molding.

In conclusion, the disclosed voice coil motors provides the following advantages. Instead of providing restoring resilience with conventional resilient members, the voice coil motors provide the axial pre-compression force by the difference between the second central height plane of the magnetic-permeable guide bars and the first central height plane of the annular magnetic member, thereby reducing the overall size and manufacturing costs thereof. Moreover, as the voice coil motors employ only an axially magnetized annular magnetic member which can be formed integrally, an excessive assembly tolerance provided by multiple permanent magnets and high manufacturing costs are prevented. Furthermore, as only an air gap exists between the movable members and the fixed members of the voice coil motors (i.e. only an air gap exists between the annular magnetic member and the coil), the size of the voice coil motors is reduced. Additionally, the voice coil motors can generate sufficient voice coil force in the absence of a magnetic-permeable yoke. Without the magnetic-permeable yoke, the size and manufacturing costs of the voice coil motors are thus reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voice coil motor, comprising:
    a fixed base;
    at least one guide bar connected to the fixed base;
    a coil connected to the fixed base, comprising a bottom;
    a support base movably fit on the guide bar to be moved along an axially moving direction with respect to the at least one guide bar; and
    an annular magnetic member formed into a single ring piece and connected to the support base and surrounded by the coil, wherein a magnetization direction of the annular magnetic member parallels the axially moving direction of the support base and the annular magnetic member, the annular magnetic member comprises a first magnetic pole and a second magnetic pole, the first magnetic pole is disposed in the coil and separated from the bottom of the coil, the second magnetic pole is disposed outside the coil, and the coil interacts with the annular magnetic member to generate a first force, driving the support base and the annular magnetic member to move along the magnetization direction of the annular magnetic member.

2. The voice coil motor as claimed in claim 1, wherein the guide bar comprises magnetic-permeable material.

3. The voice coil motor as claimed in claim 2, wherein the annular magnetic member comprises a first central height plane perpendicular to the magnetization direction of the annular magnetic member, the guide bar comprises a second central height plane parallel to and separated from the first central height plane, the annular magnetic member and guide bar attract each other to generate a second force, and the direction of the second force is opposite to that of the first force.

4. The voice coil motor as claimed in claim 1, further comprising a magnetic-permeable member connected to the fixed base.

5. The voice coil motor as claimed in claim 4, wherein the annular magnetic member comprises a first central height plane perpendicular to the magnetization direction of the annular magnetic member, the magnetic-permeable member comprises a third central height plane parallel to and separated from the first central height plane, the annular magnetic member and magnetic-permeable member attract each other to generate a third force, and the direction of the third force is opposite to that of the first force.

6. The voice coil motor as claimed in claim 1, wherein the guide bar comprises non-magnetic-permeable material.

7. The voice coil motor as claimed in claim 6, wherein the guide bar is integrally formed with the fixed base by injection molding.

8. The voice coil motor as claimed in claim 1, further comprising a position sensor connected to the fixed base and opposing the annular magnetic member, detecting movement of the annular magnetic member.

9. The voice coil motor as claimed in claim 8, wherein the position sensor comprises a Hall sensor or a magnetic resistance sensing element.

10. The voice coil motor as claimed in claim 1, further comprising a position sensor and a positioning magnet, wherein the positioning magnet is connected to the support base, and the position sensor is connected to the fixed base and opposes the positioning magnet, detecting movement of the positioning magnet.

11. The voice coil motor as claimed in claim 10, wherein the position sensor comprises a Hall sensor or a magnetic resistance sensing element.

12. The voice coil motor as claimed in claim 1, further comprising a position sensor connected to the fixed base and opposing the support base, detecting movement of the support base.

13. A voice coil motor, comprising:
    a fixed base;
    at least one guide bar connected to the fixed base;
    a first coil connected to the fixed base, comprising a bottom;
    a second coil connected to and disposed on the first coil, wherein a central axis of the first coil aligns that of the second coil;
    a support base movably fit on the guide bar to be moved along an axially moving direction with respect to the at least one guide bar; and
    an annular magnetic member formed into a single ring niece and connected to the support base and surrounded by the first and second coils, wherein a magnetization direction of the annular magnetic member parallels the axially moving direction of the support base and the annular magnetic member, the annular magnetic member comprises a first magnetic pole and a second magnetic pole, the first magnetic pole is disposed in the first coil and separated from the bottom of the first coil, the second magnetic pole is disposed in the second coil, and when the first and second coils are respectively energized by application of opposite currents, the first and second coils interact with the annular magnetic member to generate a first force, driving the support base and the annular magnetic member to move along the magnetization direction of the annular magnetic member.

14. The voice coil motor as claimed in claim 13, wherein the guide bar comprises magnetic-permeable material.

15. The voice coil motor as claimed in claim 14, wherein the annular magnetic member comprises a first central height plane perpendicular to the magnetization direction of the annular magnetic member, the guide bar comprises a second central height plane parallel to and separated from the first central height plane, the annular magnetic member and guide bar attract each other to generate a second force, and the direction of the second force is opposite to that of the first force.

16. The voice coil motor as claimed in claim 13, wherein the size of the first coil is the same as that of the second coil.

17. The voice coil motor as claimed in claim 13, wherein the guide bar comprises non-magnetic-permeable material.

18. The voice coil motor as claimed in claim 17, wherein the guide bar is integrally formed with the fixed base by injection molding.

19. A pre-compression generation device, comprising:
a magnetic member, with a magnetization direction parallel to a moving direction thereof, wherein the magnetic member comprises a first central height plane perpendicular to the magnetization direction thereof; and
a guide bar comprising magnetic-permeable material and a second central height plane parallel to and separated from the first central height plane, wherein the magnetic member and the guide bar which are relatively moved attract each other to generate an axial pre-compression force parallel to the magnetization direction of the annular magnetic member.

20. A pre-compression generation device, comprising:
a magnetic member, with a magnetization direction parallel to a moving direction thereof, wherein the magnetic member comprises a first central height plane perpendicular to the magnetization direction thereof; and
a guide bar: and
a magnetic-permeable member being movable with respect to the guide bar and comprising magnetic-permeable material and a third central height plane parallel to and separated from the first central height plane, wherein the magnetic member and the magnetic-permeable member which are relatively moved attract each other to generate a pre-compression force.

21. A voice coil motor, comprising:
a fixed base;
at least one guide bar connected to the fixed base;
a coil connected to the fixed base, comprising a bottom;
a support base movably fit on the guide bar;
an annular magnetic member connected to the support base and surrounded by the coil, wherein a magnetization direction of the annular magnetic member parallels a moving direction of the support base and the annular magnetic member, the annular magnetic member comprises a first magnetic pole and a second magnetic pole, the first magnetic pole is disposed in the coil and separated from the bottom of the coil, the second magnetic pole is disposed outside the coil, and the coil interacts with the annular magnetic member to generate a first force, driving the support base and the annular magnetic member to move along the magnetization direction of the annular magnetic member; and
a position sensor comprising a photo-interrupter comprising a light outputting portion and a light receiving portion, wherein the support base comprises a reflective surface, the light outputting portion outputs light to the reflective surface of the support base, and the light receiving portion receives the light reflected by the reflective surface.

22. A voice coil motor, comprising:
a fixed base;
at least one guide bar connected to the fixed base;
a coil connected to the fixed base, comprising a bottom;
a support base movably fit on the guide bar;
an annular magnetic member connected to the support base and surrounded by the coil, wherein a magnetization direction of the annular magnetic member parallels a moving direction of the support base and the annular magnetic member, the annular magnetic member comprises a first magnetic pole and a second magnetic pole, the first magnetic pole is disposed in the coil and separated from the bottom of the coil, the second magnetic pole is disposed outside the coil, and the coil interacts with the annular magnetic member to generate a first force, driving the support base and the annular magnetic member to move along the magnetization direction of the annular magnetic member; and
a position sensor comprises a photo-interrupter comprising a light outputting portion and a light receiving portion, wherein the annular magnetic member comprises a reflective surface, the light outputting portion outputs light to the reflective surface of the annular magnetic member, and the light receiving portion receives the light reflected by the reflective surface of the annular magnetic member.

* * * * *